Patented Sept. 29, 1936

2,055,893

UNITED STATES PATENT OFFICE 2,055,893

MANUFACTURE OF CARBOHYDRATE COMPOUNDS

Henry Dreyfus, London, England

No Drawing. Application February 1, 1934, Serial No. 709,333. In Great Britain February 16, 1933

3 Claims. (Cl. 260—152)

This invention relates to improvements in the manufacture of derivatives of cellulose and other carbohydrates, and is more particularly concerned with the manufacture of hydroxyalkyl derivatives of cellulose or of other carbohydrates, and the production of industrial products therefrom.

The production of hydroxyalkyl derivatives of cellulose and of other carbohydrates has been known for many years. Two methods have been suggested for the production of these compounds from cellulose, namely by the action of chlorhydrins upon cellulose in presence of alkali, or the action of alkylene oxides upon alkali cellulose or upon cellulose in the absence of alkali, the alkylene oxide being employed in the liquid or gaseous state.

When an alkylene oxide, such as ethylene oxide, is brought to reaction with cellulose, particularly in the absence of the substantial quantities of alkali necessary to make an alkali cellulose, it is found that the addition of the ethylene oxide to the cellulose takes place only to a limited extent. The present invention is concerned more particularly with the production of hydroxyalkyl celluloses in which a high degree of substitution is effected, and particularly a degree of substitution of at least about one hydroxyalkyl group to the cellulose molecule $C_6H_{10}O_5$, and preferably more than one, for example 1½ to 2 or more of such ether groups. According to the present invention the cellulose is brought to reaction with an alkylene oxide under pressure, and especially at pressures of 5–10 atmospheres or more, for example up to 50 atmospheres. The temperature in such an etherification reaction may be quite low, for example 0–20° C. or higher, depending somewhat upon the reactivity of the cellulose and the particular alkylene oxide being used. However the invention does not exclude the use of much higher temperatures, for example 80–120° C. or more. The temperature employed may be such that under the pressure conditions prevailing the alkylene oxide is present wholly in the liquid state, or, which is preferred, it may be such that the oxide is present partially or wholly in the gaseous or vapour phase, and in the latter case the pressure may be due solely to the vapour of the alkylene oxide or may be partly due to the presence of other gases or vapours, e. g. nitrogen or carbon dioxide.

The process of the invention may be applied to the cellulose material in the absence of alkali or similar reagents, and in fact I prefer not to have present during the etherification sufficient alkali to make an alkali cellulose. However, I have found that it is advantageous to employ relatively small quantities of alkali or of another base, for example alkylamines or alkylated aromatic amines, or hydroaromatic amines. Thus, for instance, I may have present in the cellulose a proportion of caustic soda under 20% on the weight of the cellulose, and preferably much less than this, for example up to 5 or 10%. Similar proportions of strong organic bases or of caustic potash may be present. The presence of these small quantities of basic substances, and particularly caustic alkali is very advantageous, since they accelerate to some extent the reaction between the alkylene oxide and at the same time do not result in an unduly rapid or violent reaction and excessive charring of the product.

The invention however includes carrying out the reaction with the alkylene oxide in the absence of alkali or other base, and in fact good results may also be achieved by having present during the reaction acidic reagents e. g. a mineral or organic acid, or an acid salt, preferably in small quantities. The strong mineral acids, such as sulphuric acid, are not however advisable when using high reaction temperatures owing to their destructive action upon the cellulose. Examples of suitable acidic substances which may be employed are sulphur dioxide and bisulphites, and acetic acid and other lower aliphatic acids.

As an alternative or in addition to having the alkali or other base or an organic or mineral acid present during the actual etherification the cellulose may be pretreated with the reagent so as to open up the cellulose, and thereby render it more reactive towards the hydroxyalkylating agent. Where strong acids are used for such a pretreatment they are preferably removed or substantially removed before subjecting the cellulose to the conditions of hydroxyalkylation characteristic of the invention, particularly if the hydroxyalkylation is effected at elevated temperatures. Weaker acids or organic acids or alkali may either be removed or be retained in the cellulose. Suitable methods of pretreatment are described in my French Patent No. 565,654 and my U. S. Patents Nos. 1,831,101 and 1,731,299.

The invention contemplates quite broadly the treatment of cellulosic material with any alkylene oxide, including ethylene oxide, propylene oxide, butylene oxide, glycide, epichlorhydrin and the like, or with mixtures of alkylene oxides. In the case of using the epichlorhydrin type of reagent if the halogen atom is to constitute the etherifying group then alkali or other base should be present during the etherification, while if the alkylene oxide group is alone to react with the cellulose the reaction should be carried out under neutral or acid conditions.

Any suitable cellulosic material may be employed for the purposes of the present invention, for example cotton linters or sulphite, sulphate or soda pulps. Cellulosic material which has been treated according to the process described in my U. S. application S. No. 680,251 filed 13th July, 1933 may be employed, and in this case the bisulphite and/or sulphur dioxide employed in the activation process may be removed prior to etherification, or may be present during such process, either wholly or in part. Preferably chemical wood pulps are subjected to an alkaline purifying step of the character described in my U. S. Patent No. 1,711,110 to remove the residual lignin and pentosan therein. Alternatively the lignin and pentosan may be removed substantially completely in a single operation, starting from wood chips or mechanical wood pulp or the like. Preferably such a complete removal of lignin, pentosan and the like is effected with the aid of comparatively dilute caustic soda or other alkali, for example a concentration up to 2 or 4%. Such a process is described in my U. S. application S. No. 705,899 filed January 9, 1934 corresponding to British application No. 3922/33 filed 8th February, 1933. Other cellulosic materials which may be used include bamboo, esparto and other grasses.

In addition to including the hydroxyalkylation of cellulose, the present invention also includes the hydroxyalkylation of dextrin, starches and similar carbohydrates, which may be effected in a similar manner.

As previously indicated the hydroxyalkylation according to the present invention is preferably effected to an ether content of 1 to 2 or more groups in the cellulose molecule. The cellulose or other carbohydrate derivatives of higher ether content are eminently suitable for use as sizes, dressings and finishes for textile and other purposes. Further, the hydroxyalkyl derivatives made by the present invention of whatever ether content may be acetylated or otherwise esterified. Thus hydroxyalkyl celluloses may be esterified, for example, with the aid of acetic anhydride or other organic acid anhydride in the presence of a suitable catalyst, such as sulphuric acid, sulphuryl chloride, hydrochloric acid, metallic halides and the like, to produce hydroxyalkyl esters of cellulose which are eminently suitable for the manufacture of lacquers, plastics, artificial filaments, yarns, films and the like. Among other ester groups which may be introduced into the hydroxyalkyl derivatives may be mentioned the propionate, butyrate, laurate, stearate and benzoate radicles. The esterified products may, if desired, be subjected to a ripening operation following upon the esterification for the purpose of removing combined catalyst and/or for conferring thereon any desired solubility characteristics. Hydroxyalkyl cellulose acetates made by the present invention, and especially those derived from ethers containing the lower hydroxyalkyl groups, are soluble or practically soluble as primary esterification products in acetone or in acetone diluted by alcohol or water, so that modifications of the solubility characteristics are not in general necessary.

The compounds obtained according to the present invention, and particularly hydroxyalkyl cellulose acetates, may be dissolved in any suitable solvents, for example acetone, methylene ethylene ether, dioxane, mixtures of methylene or ethylene chloride with ethyl or methyl alcohol or other relatively volatile solvents, or in higher boiling solvents, for example diacetone alcohol and ethyl lactate, or mixtures of two or more solvents, and may be spun through suitable orifices into either an evaporative medium or into a coagulating bath to form artificial filaments or similar products. Moreover, foils, films, sheets and similar materials may be obtained from the cellulose derivatives by imparting the required shape to a solution of the cellulose derivative and effecting coagulation either by an evaporative process or in a liquid medium. Coagulating media which may be employed include hydrocarbons and halogenated hydrocarbons or other organic liquids. Preferably however, aqueous media are employed, for example aqueous solutions containing high concentrations of solvents for the cellulose derivative, preferably solvents having a vapour pressure lower than that of water, or aqueous media containing salts, e. g. sodium or calcium chloride or sodium bisulphite, preferably in relatively high concentrations. Media containing both solvents for the cellulose derivative and also salts may also be employed. Examples of suitable methods for the production of filaments, films and the like by wet spinning processes are described in U. S. Patents Nos. 1,465,994 and 1,467,493 and U. S. applications S. Nos. 402,785 filed 26th October, 1929, 418,414 filed 3rd January, 1930, 469,622 filed 21st July, 1930, 681,166 filed 19th July, 1933, 681,492 filed 21st July, 1933, 681,493 filed 21st July, 1933, 684,221 filed 8th August, 1933, 686,313 filed 22nd August, 1933, 686,314 filed 22nd August, 1933, 686,739 filed 25th August, 1933, and 695,395 filed 27th October, 1933, while, with regard to dry spinning processes, I would refer particularly to those described in U. S. Patents Nos. 1,602,125, 1,731,317, 1,541,104, 1,814,468 and 1,934,618.

The filaments, films and other similar products obtained from the cellulose derivatives of the present invention may be subjected to any desired after-treatment processes. Thus, they may be subjected to stretching operations to improve their tensile strength and other properties as described, for example, in U. S. Patent No. 1,709,470 and U. S. applications S. Nos. 378,684 filed 16th July, 1929, 573,424 filed 6th November, 1931, 602,844 filed 2nd April, 1932, 666,655 filed 18th April, 1933 and 666,656 filed 18th April, 1933. Such stretching operations may be effected during or continuously with the production of the artificial materials or as an operation separate from that of their production, and in the case of foils, films and the like stretching may be longitudinal and/or lateral. When the operation is carried out on the materials as a process separate from that of their production, the materials are preferably subjected to a softening treatment to bring them to a condition such that a relatively high degree of stretch may be obtained, and such softening treatment may be effected either prior to or continuously with the stretching operation, and in the latter case the stretching tension may be allowed to extend back to the portion of the materials which has not yet reached the desired softened condition, or may be restricted to the softened portion of the materials. Two or more softening treatments may, if desired, be employed, as is described in U. S. applications S. Nos. 638,776 filed 20th October, 1932, and 688,499 filed 7th September, 1933.

The artificial materials may also be subjected to shrinking operations in order to increase their extensibility or for the production of special effects, and in this connection reference is made to U. S. applications S. Nos. 607,667 filed 26th April, 1932, 609,255 filed 4th May, 1932 and 611,240 filed 13th May, 1932. Shrinking processes as described in U. S. application S. No. 611,240 filed 13th May, 1932 are particularly valuable in the case of artificial materials having a relatively low extension, such as may be obtained with wet spun artificial materials or dry spun artificial materials which have been subjected to a stretching operation. Alternatively, materials which have been shrunk may subsequently be subjected to a stretching operation as described in U. S. application S. No. 672,805 filed 25th May, 1933. If desired, shrinking and stretching may form a continuous operation and may be effected in either order.

The artificial materials may also be subjected to any other after-treatment processes. Thus, they may be subjected to operations designed to modify their lustre, for example by incorporating therein finely divided organic or inorganic compounds. Again, inorganic salts or other compounds may be incorporated in the materials for weighting or mordanting purposes or for the purpose of increasing the safe ironing point of the materials or improving their fire resistant properties.

The following examples are given in order to illustrate the invention, but it is to be understood that they do not limit it in any way:—

Example 1

Cotton linters containing about 10% by weight of caustic soda are heated with 2–4 times their weight of ethylene oxide at a temperature of 80°–100° C. and a pressure of 6–8 atmospheres for a period of about 4–6 hours or until an hydroxyethyl cellulose having the desired content of ether groups is obtained.

Example 2

Cotton linters which have been pretreated with acetic acid as described, for example, in my U. S. Patent No. 1,731,299, are reacted with 2–4 times their weight of ethylene oxide in the presence of nitrogen or other inert gas, the temperature being about 40°–60° C. and the pressure 12–15 atmospheres.

Example 3

Cotton linters which may either have been pretreated with acetic acid as in Example 2 or contain about 10% of caustic soda as in Example 1 are heated with 3–5 times their weight of propylene oxide in the presence of nitrogen at a temperature of 50°–70° C. and a pressure of about 25–30 atmospheres.

In the above examples when a hydroxyalkyl cellulose having the desired hydroxyalkyl content has been obtained, the reaction mixture may be allowed to cool and the gaseous substances present removed. The product may then be washed with any suitable liquid medium which is a non-solvent for the cellulose ether, e. g. water or dilute acid, alcohol, aqueous alcohol or ether and dried.

The hydroxyalkyl celluloses obtained according to any of the preceding examples may be subjected to an acetylation or other esterification process in any suitable manner.

What I claim and desire to secure by Letters Patent is:—

1. The process of making hydroxyalkyl ethers of cellulose comprising reacting cellulose with a hydroxyalkylating agent under a superatmospheric pressure of at least 5 atmospheres pressure and in the presence of a base selected from the group consisting of alkalies and amines in an amount not more than 10% of the weight of the cellulose, and continuing the reaction under such conditions that there is formed a product that contains more than 1½ hydroxyalkyl groups per $C_6H_{10}O_5$ molecule.

2. The process of making hydroxyalkyl ethers of cellulose comprising reacting cellulose with an alkylene oxide under a superatmospheric pressure of at least 5 atmospheres pressure and in the presence of caustic soda in an amount not more than 10% of the weight of the cellulose, and continuing the reaction under such conditions that there is formed a product that contains more than 1½ hydroxyalkyl groups per $C_6H_{10}O_5$ molecule.

3. The process of making hydroxyalkyl ethers of cellulose comprising reacting cellulose with an alkylene oxide under a superatmospheric pressure of at least 5 atmospheres pressure and in the presence of an amine in an amount not more than 10% of the weight of the cellulose, and continuing the reaction under such conditions that there is formed a product that contains more than 1½ hydroxyalkyl groups per $C_6H_{10}O_5$ molecule.

HENRY DREYFUS.